(12) United States Patent
Downey

(10) Patent No.: US 7,082,716 B2
(45) Date of Patent: Aug. 1, 2006

(54) ROLLABLE WATERING TUBE

(76) Inventor: Darrell Keith Downey, 315 Windsor Falls Dr., Canton, GA (US) 30114

( * ) Notice: Subject to any disclaimer, the term of this patent is extended or adjusted under 35 U.S.C. 154(b) by 141 days.

(21) Appl. No.: 10/709,417

(22) Filed: May 4, 2004

(65) Prior Publication Data

US 2005/0246952 A1    Nov. 10, 2005

(51) Int. Cl.
*A01G 29/00* (2006.01)
*A01G 25/00* (2006.01)
*B05B 15/06* (2006.01)

(52) U.S. Cl. .................... 47/48.5; 47/79; 239/285; 239/273

(58) Field of Classification Search ............. 47/48.5, 47/21.1, 79, 32.1, 2, 32.4; 40/41–45; 239/550, 239/285, 273, 542, 546
See application file for complete search history.

(56) References Cited

U.S. PATENT DOCUMENTS

| | | | | |
|---|---|---|---|---|
| 2,511,486 | A * | 6/1950 | Thames | 239/542 |
| 2,753,156 | A * | 7/1956 | Rieger | 256/12.5 |
| 3,711,992 | A * | 1/1973 | Martin | 47/48.5 |
| 4,071,974 | A * | 2/1978 | Tripp, Jr. | 47/2 |
| 4,869,018 | A * | 9/1989 | Scales et al. | 47/33 |
| 5,020,271 | A * | 6/1991 | Walker | 47/21.1 |
| 5,067,272 | A * | 11/1991 | Constantz | 47/48.5 |
| 5,117,582 | A * | 6/1992 | Cissel et al. | 47/32.4 |
| 5,301,633 | A * | 4/1994 | Lloyd | 119/6.7 |
| 5,613,320 | A * | 3/1997 | Thomasson et al. | 47/32.1 |
| 6,023,883 | A | 2/2000 | Bacon, Jr. | 47/29 |
| 6,108,970 | A * | 8/2000 | Ball | 47/48.5 |
| 6,293,477 | B1 * | 9/2001 | Chambers | 239/542 |
| 6,385,900 | B1 * | 5/2002 | George | 47/40.5 |
| 6,484,439 | B1 * | 11/2002 | Tonkin et al. | 47/48.5 |
| D493,075 | S * | 7/2004 | Schmidt | D8/1 |
| 2003/0203799 | A1 * | 10/2003 | VandenHeuvel et al. | 493/394 |

FOREIGN PATENT DOCUMENTS

| | | | |
|---|---|---|---|
| DE | 3304800 A1 | * | 8/1984 |
| FR | 2561063 A1 | * | 9/1985 |
| FR | 2666958 A1 | * | 3/1992 |
| GB | 2113062 A | * | 11/1982 |

* cited by examiner

*Primary Examiner*—Andrea M. Valenti
(74) *Attorney, Agent, or Firm*—Richard D. Fuerle

(57) ABSTRACT

A devise for watering vegetation has a cylindrical tube that can be laid flat and rolled up. The tube has a watertight seal about 2 to about 6 inches from each end, which leaves a flap at each end. The flaps can be attached to stakes that can be driven into the ground. There are one or two openings along the length of the tube through which water can be admitted into the tube. At or near the bottom of the tube is at least one drip emitter from which water can leave the tube. Two or more tubes can be joined together using a single stake though the flaps of the tubes. The tubes can be arranged in a line, a circle, or other arrangements.

19 Claims, 6 Drawing Sheets

ROLLABLE WATERING TUBE

BACKGROUND OF INVENTION

This invention relates to a flexible tube that can be filled with water for watering trees and other vegetation. In particular, it relates to a flexible, waterproof tube sealed at each end and held in a fixed position, that slowly leaks water out through apertures at its base.

Hundreds of millions of dollars are spent on trees and other plantings for landscaping, commercial growing, and home gardening. Countless hours of labor are invested to water-in these plantings, until the planting establishes an extended root system. Despite these efforts, millions of dollars are spent replacing trees and other plantings due to improper watering during the root establishment period.

Most forms of vegetation, when established in a landscape, have moisture supplying roots that penetrate the soil for significant distances. For example, many forms of fully established trees are known to have root systems that extend radially outward from the base of the trunk, well beyond the drip line of the tree's leaf canopy. For this reason, even a light rainfall supplies a significant amount of water to an established plant.

Trees, shrubs, and other forms of vegetation, are commercially supplied with their roots tightly concentrated into a relatively small diameter, soil filled plastic container or a ball that is held together with a fabric wrap, most commonly burlap. When the plant is removed from the container and is planted in the soil, a light rainfall supplies very little water to the plant, relative to an identical plant with an established (extended) root system. For this reason, many plantings fail to survive even in periods of normal rainfall without substantial efforts to provide supplemental watering. A drought further heightens the need to supply supplemental watering. Also, if people go on vacation or are going to be away for some time, they may wish to be sure that their plant has adequate water while they are away, rather than risk losing costly plants. In many cases, people desire to install plantings in remote locations, such as a vacation home, or even the center median of a highway, but are unable to do so because of the costs or efforts required to supply supplemental water to the new planting during the critical period of root extension and establishment.

A number of devices have been invented that can be placed around trees or other plants and filled with water. The devices slowly let the water leak out into the ground. Some of these devices are expensive to make, however, or are not versatile enough to be used for a variety of different applications.

For example, U.S. Pat. No. 6,108,970 shows a self-watering plant guard that can be placed around a tree. It is filled with water and slowly lets the water out through a water release outlet in the base. Stakes are used to secure it. However, the devise has numerous internal compartments and would be expensive and difficult to make. Further, because of the formation of these multiple compartments to create and sustain vertical rigidity, the capacity for holding water is significantly reduced. Lastly, because of the device's installed height, it is not adaptable to trees and other plantings that have low hanging branches (example: conifers).

U.S. Pat. No. 6,023,883 shows a drip irrigator that is fitted around a tree and is filled with water which percolates out through multiple openings in the bottom. It has a removable cap at the top for filling. It is made in a C-shape, which keeps the holes at the bottom and the cap at the top. This device uses the trunk of the tree to hold it in place. In plantings that are not perfectly vertical, it places a substantial horizontal component of force upon the trunk of the tree when filled with water. Further, because the device comes into contact with the trunk of the tree, there is no air circulation, which promotes the formation of mildew and trunk discoloration. The device is not adaptable to plants having low hanging branches and is not adaptable to multi-trunk trees and shrubs. The method of administering water from the bottom of the device (a series of orifices) is prone to plugging from dirty water. In a commercial application, the device releases the full contents of its reservoir in a period of six to ten (6–10) hours.

SUMMARY OF INVENTION

The watering device of this invention is a flexible tube that can be flattened and rolled up for storage or ease in transporting it. The tube is sealed a short distance from each end and the portion of the tube that extends beyond the seal is attachable to a stake so that a stake can hold the tube in an upright position. There are one or two openings in the top of the tube for filling it with water and numerous drip emitters in the bottom through which the water gradually leaks out into the soil around a plant. There are no internal compartments or reinforcements on the tube, making it simple and inexpensive to manufacture. Because of the flexibility of the design, large quantities of water may be retained and administered over extended periods of time, from one day to one month.

DETAILED DESCRIPTION

Figure 1:
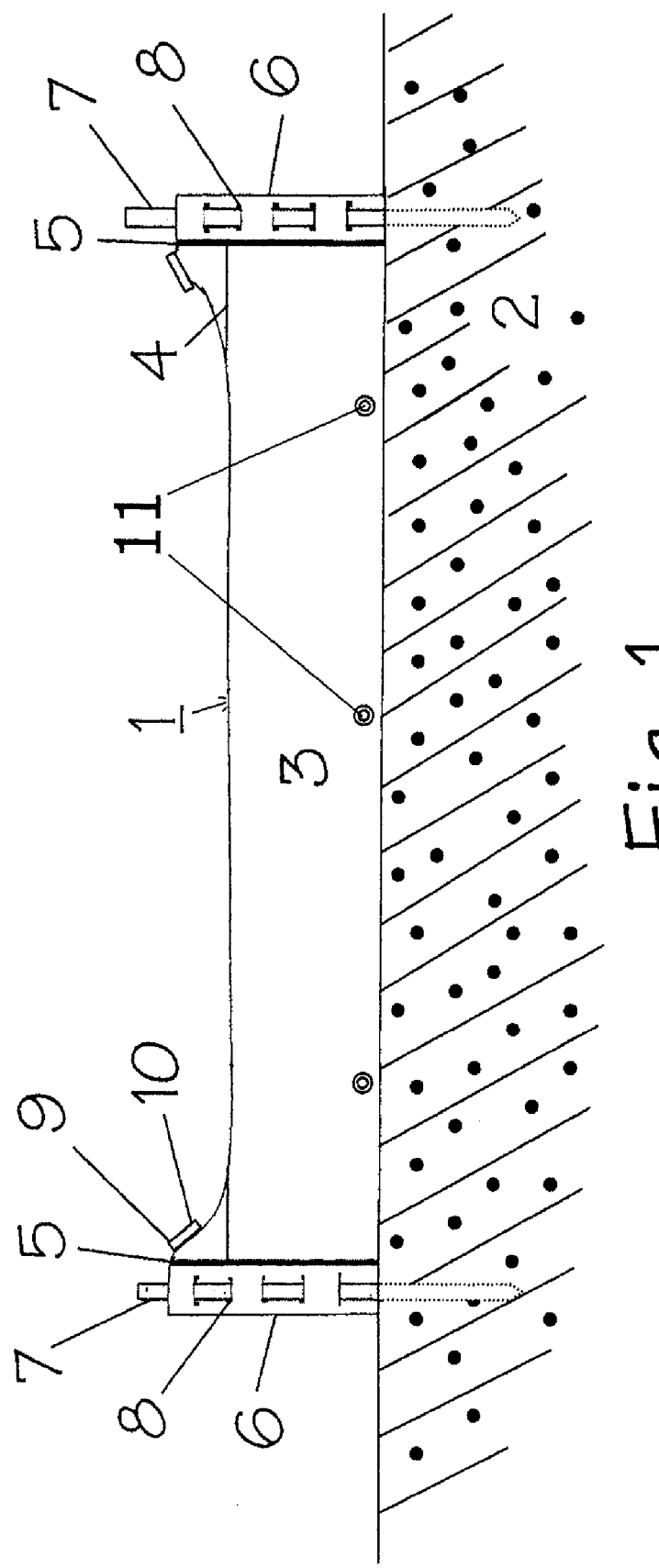
FIG. 1 is a side view of a certain presently preferred embodiment of a watering tube according to this invention in a straight position, staked and filled with water.

In FIG. 1, cylindrical watering tube 1 is shown in a straight position on ground 2 with its longitudinal axis parallel with the ground, filled with water 3 to level 4. Tube 1 may be made of any water-impermeable material that is flexible enough that it can be laid flat (so that the tube can be rolled up). Plastics are preferred as they are inexpensive and durable, but rubberized canvas and other materials may also be used. Examples of plastics that may be used include polyethylene, polypropylene, and poly(vinyl chloride). Low density polyethylene is preferred. Various additives may be used in the material to render it less susceptible to ultraviolet degradation and extend its life. It may be clear (transparent or translucent) so that the water level can be easily seen, but colored tubes are preferred to slow internal algae growth and to make the device blend into the landscape better. Tube 1 may have any diameter, but diameters of about six to about fourteen inches are preferred for outdoor use. Smaller diameters may be used for indoor or outdoor potted plants. Tube 1 may have any length, but lengths of about two to about thirty-six feet are preferred for outdoor use.

Tube 1 has a watertight seal 5 at each end. Seals 5 may be made by bonding the material of the tube together using, for example, heat and pressure or an adhesive, depending upon the material. Other types of seals may also be used. Seals 5 are preferably parallel, linear, perpendicular to the longitudinal axis of tube 1, and should not prevent tube 1 from being easily rolled up. Each seal 5 is positioned away from the end of tube 1, preferably about two to about six inches, so that the portion of tube 1 that is between seal 5 and the end of tube 1 forms a flap 6 that can be attached to a stake 7, which is driven vertically into ground 2. Any means of attaching flaps 6 to stakes 7 may be used. For example, flaps 6 may be clipped, stapled, or tied to stakes 7 or flaps 6 may be sealed at the end and open at the top and bottom so that a stake can be inserted through the openings. Preferably, however, flaps 6 have at least two horizontal slits 8 through their center portions, as shown in FIG. 1, so that stakes 7 can be inserted through the slits, as that means of attachment is inexpensive and reliable.

Tube 1 is provided with two openings 9 at or near its highest portions, which are preferably aligned with one end of seals 5 and are preferably within about one inch of seals 5. While a single opening 9 may be used, it is preferable to have two openings, one for filling and the other to vent the air out as the air is displaced by water 3. Each opening 9 is provided with a removable cap 10 to seal tube 1 and prevent the entry of mosquitoes and debris. Other types of seals may also be used, such as clips, ties, or zipper locked (see FIGS. 3 and 4) or the openings may be left unsealed. Since tube 1 is straight (unless it is deliberately bent), stakes 7 are needed to prevent tube 1 from rolling or moving, which could result in openings 9 not being at or near the top of tube 1.

At or near the base of tube 1 is at least one drip emitter 11 through which water gradually passes out of tube 1; at least two drip emitters are preferred. Drip emitters 11 may be simply punctures in tube 1, made with a pin or needle, but punctures are not preferred as they may clog and it is hard to control the amount of water that passes through them. While any type of drip emitter may be used, a preferred drip emitter is lengths of small (about 0.04 inch) diameter coiled plastic tubing, sold by Australis Irrigation Pty. Ltd. as "Triklon Coil Dripper." (See Australian Patent No. 415859.). That drip emitter is preferred because the drip rate can be increased in the field by simply cutting off a portion of the plastic tubing. Another preferred drip emitter is sold by Toro as "Classic E-2." Both types of drip emitters provide a flow path that has a small cross-sectional area and a high length-to-diameter ratio (i.e., about 100 to about 300). Unlike a simple pin hole, they are also less prone to plugging because of their low inlet velocity. While they are designed to be used at minimum operating pressures of around 14 psig, they may be used at pressures under 1 psig to obtain very low and continuous flow rates. Both drip emitters have smooth, hollow shafts with barbed or sharpened points. They are simply gouged into tube 1 at a desired location after tube 1 has been filled with water. As the point of the drip emitter engages the plastic, the plastic stretches inwards, then tears. Due to the pressure of the water, the stretched plastic presses against the smooth surface of the underside of the head of the emitter, forming a seal. The drip emitters may be attached in the manufacturing process, but since it adds to the cost and their position may not be the most desirable position (relative to the placement of the plant, elevation, etc.), it is preferable to attach them in the field. Stakes 7 also keep drip emitters 11 at or near the bottom of tube 1, so that most of the water in tube 1 can drain out. A small amount of water is preferably retained in tube 1 to prevent the tube from being blown about by the forces of the wind, after it is substantially emptied. This retained water also serves as a sediment trap for impurities that might cause plugging of the drip emitters.

Figure 2:
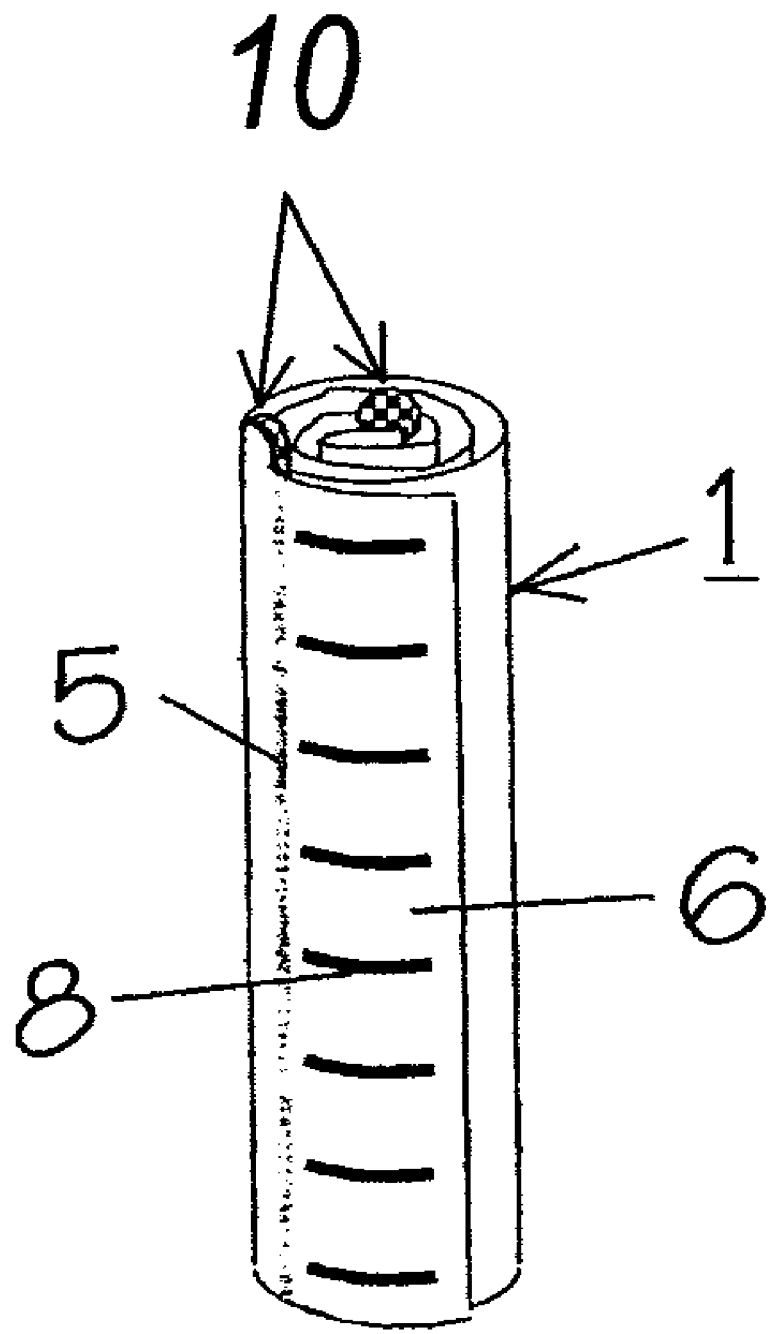
FIG. 2 is a plan view of the watering tube of FIG. 1, rolled up.

In FIG. 2, watering tube 1 is shown flattened and rolled up. When tube 1 is rolled up, it requires very little space and can be easily stored and transported.

Figure 3:
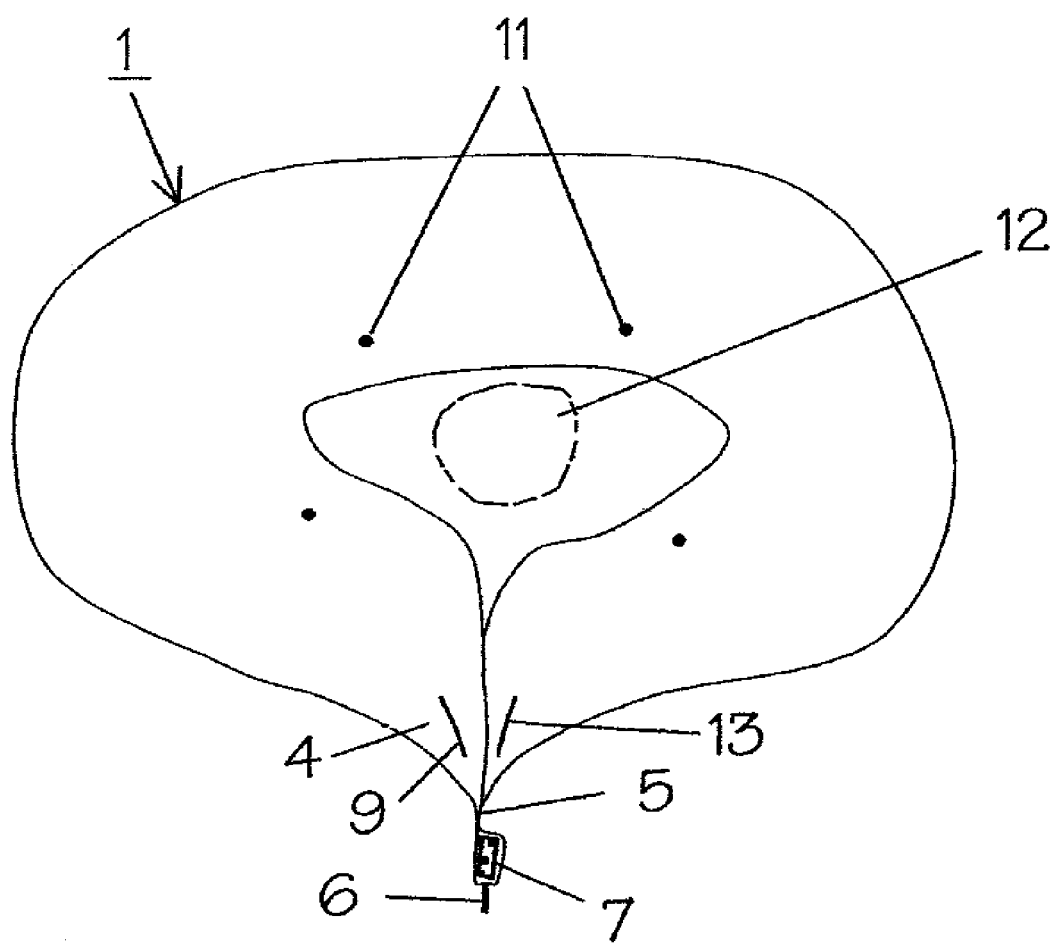
FIG. 3 is a plan view of the watering tube shown in FIG. 1 encircling a tree, staked and filled with water.
Figure 4:
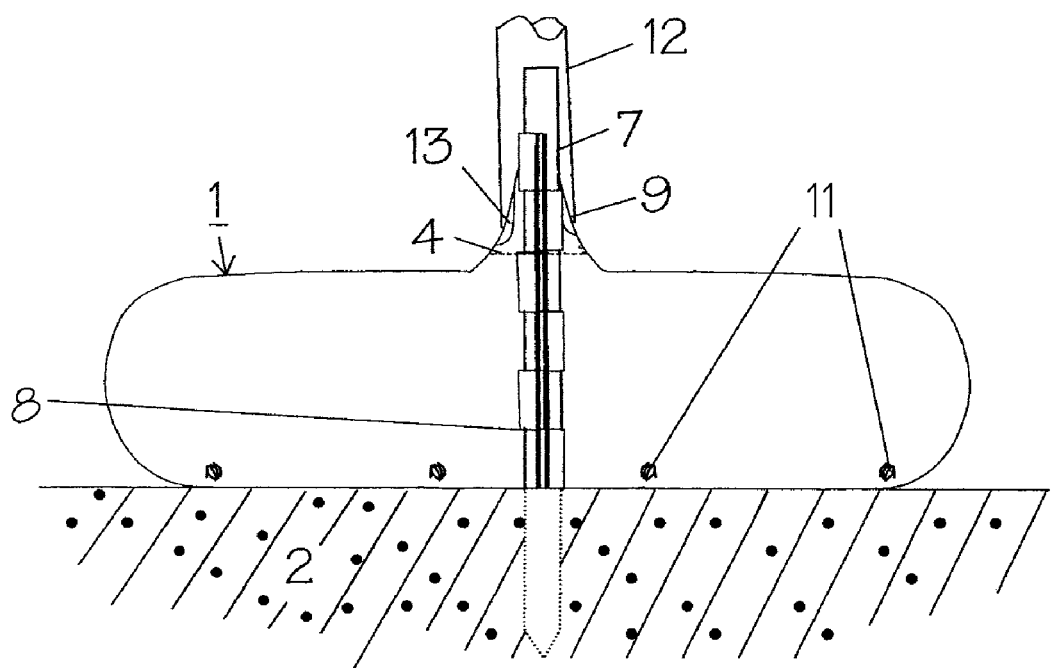
FIG. 4 is a frontal side view of the watering tube shown in FIG. 3.

In FIGS. 3 and 4, tube 1 has been bent around to encircle tree 12. Only a single stake 7 is used, passing through slits 8 at both ends of tube 1. In FIGS. 3 and 4 openings 9 are sealed by means of a zipper lock seal 13, which consists of channels in the plastic that fit together to form a seal.

Figure 5:
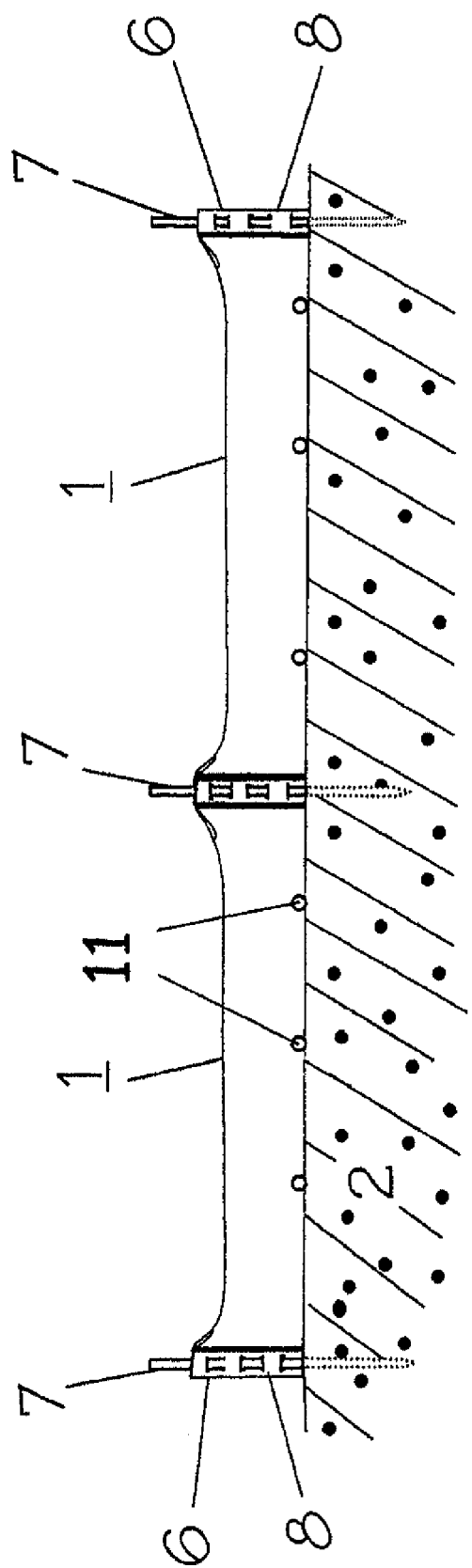
FIG. 5 is a side view showing two watering tubes as shown in FIG. 1 joined together.

In FIG. 5, two tubes 1, as shown in FIG. 1, have been joined together using a single stake 7, by passing the stake through slits 8 at the ends of the two tubes 1. Any number of tubes 1 may be joined together in this manner so that long rows of plants may be watered. The joined-together tubes 1 may be bent (before filling with water) to accommodate the locations of the plants to be watered.

Figure 6:
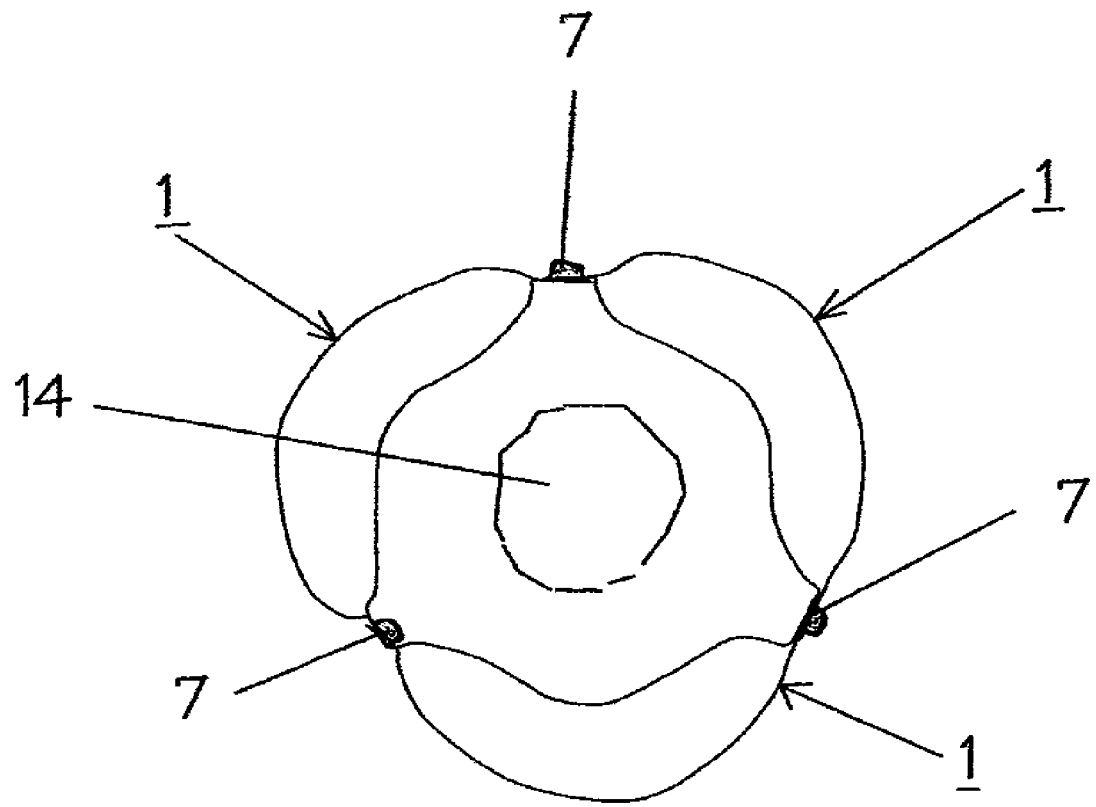
FIG. 6 is a plan view showing three watering tubes as shown in FIG. 1, joined together.

In FIG. 6, three tubes 1, as shown in FIG. 1, have been joined together in order to water tree 14.

The watering tube may be sold as a roll (see FIG. 2) with stakes, or the purchaser may provide his own stakes. To use the watering tube, it is taken to the location of the vegetation to be watered, unrolled, and positioned near or around the vegetation. The stakes are inserted through the ends of the tube and are driven into the ground and the tube is filled with water (or the stakes may be driven into the ground after filling the tube with water). Drip emitters are then inserted into the base of the tube at the desired locations, if they have not already been installed.

The invention claimed is:

1. A device for watering vegetation comprising
    (A) a cylindrical tube having two ends and opposing inside surfaces, where the opposing inside surfaces do not contact each other except about 2 to about 6 inches from each end of said tube, where a watertight seal that extends from the bottom of said tube to the top of said tube is formed between opposing surfaces of the inside of said tube, forming a compartment inside said tube and leaving a flap of said tube about 2 to about 6 inches long at each end of said tube;
    (B) horizontal slits extending part of the way across said flaps, whereby one or more stakes are inserted through said slits and said stakes hold top ends of said tube higher than rest of said tube, the bottom of said tube substantially contacts the ground surface;
    (C) one or two openings into said compartment at or near said seals where said top ends of said tube are higher than any other top portion of said tube between said seals, through which water can be admitted into said compartment; and
    (D) at least one drip emitter in said compartment, at or near the bottom of said tube, from which water exits said tube, whereby when said tube is filled with water said tube assumes a cross-sectional shape that is wider than it is high and when said tube is empty it may be laid flat and rolled up.

2. A device according to claim 1 wherein said tube is made of plastic.

3. A device according to claim 2 wherein said tube is made of low density polyethylene.

4. A device according to claim 2 wherein said opening(s) is sealed by means of a zipper lock.

5. A device according to claim 1 wherein said opening(s) is sealed by means of a removable cap.

6. A device according to claim 1 wherein said opening(s) is unsealed.

7. A device according to claim 1 wherein said emitters comprise coiled tubing.

8. A device according to claim 1 wherein said emitters comprise puncture holes.

9. A device according to claim 1 wherein said tube is about 6 to about 14 inches in diameter.

10. A device according to claim 1 wherein said tube is about 2 to about 36 feet long.

11. A device according to claim 1 wherein said tube is colored to prevent the growth of algae.

12. A device according to claim 1 wherein said horizontal slits are aligned in each flap so that a single stake may be inserted through the slits in two flaps.

13. A device according to claim 12 wherein said tubes are joined in a line by attaching the flaps of two tubes to a single stake.

14. A device according to claim 12 wherein a single tube is formed into a circle by inserting a single stake through the slits in the flaps at both ends of said tube.

15. A device according to claim 1 wherein said tube is rolled up.

16. A device according to claim 1 wherein there are two openings at or near the top of said tube, each within about one inch from a seal, whereby water is admitted into said tube through one opening while air leaves said tube through the other opening.

17. A device according to claim 1 wherein each opening is within about an inch from a seal.

18. A device for watering vegetation comprising
(A) at least two cylindrical tubes, each tube having two ends and opposing inside surfaces, where the opposing inside surfaces do not contact each other except about 2 to about 6 inches from each end of said tubes, where a watertight seal that extends from the bottom of said tubes to the top of said tubes is formed between opposing surfaces of the inside of said tubes, forming a compartment and leaving a flap of said tubes about 2 to about 6 inches long at each end of said tubes, where flaps of said tubes are joined together at junctures;
(B) at least two stakes that can be driven into the ground;
(C) horizontal slits that extend part of the way across said flaps, through which said stakes are inserted, where at each juncture a single stake is inserted through the horizontal slots of all the flaps at that juncture, whereby said stakes hold top ends of said tubes higher than the rest of said tube, the bottom of said tube substantially contacts the ground surface
(D) two openings into said compartments at or near the top of said tubes, each within about 1 inch from a seal, where said top ends of said tube are higher than any other top portion of said tube between said seals, whereby water is admitted into said compartment through one opening while air leaves said tubes through the other opening; and
(E) at least one drip emitter at or near the bottom of said tubes from which water exits said tubes, whereby when said tubes are filled with water said tubes assume a cross-sectional shape that is wider than it is high and when said tubes are empty they may be laid flat and rolled up.

19. A device for watering vegetation comprising
(A) a single cylindrical tube in the shape of a torus, said tube having
  (1) two ends and opposing inside surfaces, where the opposing inside surfaces do not contact each other except about 2 to about 6 inches from the ends of said tube, where a watertight seal that extends from the bottom of said tube to the top of said tube is formed between opposing surfaces of the inside of said tube, forming a compartment and leaving a flap of said tube about 2 to about 6 inches long at each end of said tube, where said flaps overlap;
  (2) horizontal slits that extend part of the way across said flaps;
  (3) two openings into said compartment at or near the top of said tube, each within about 1 inch from a seal, whereby water is admitted into said tube through one opening while air leaves said tube through the other opening; and
  (4) at least one drip emitter at or near the bottom of said tube from which water exits said tube, the bottom of said tube substantially contacts the ground surface; and
(B) a single stake inserted through said slits of both flaps of said tube and driven into the ground, where said stake holds top ends of said tube higher than rest of said tube, whereby when said tube is filled with water said tube assumes a cross-sectional shape that is wider than it is high and when said tube is empty it may be laid flat and rolled up.

* * * * *